Figure 1:
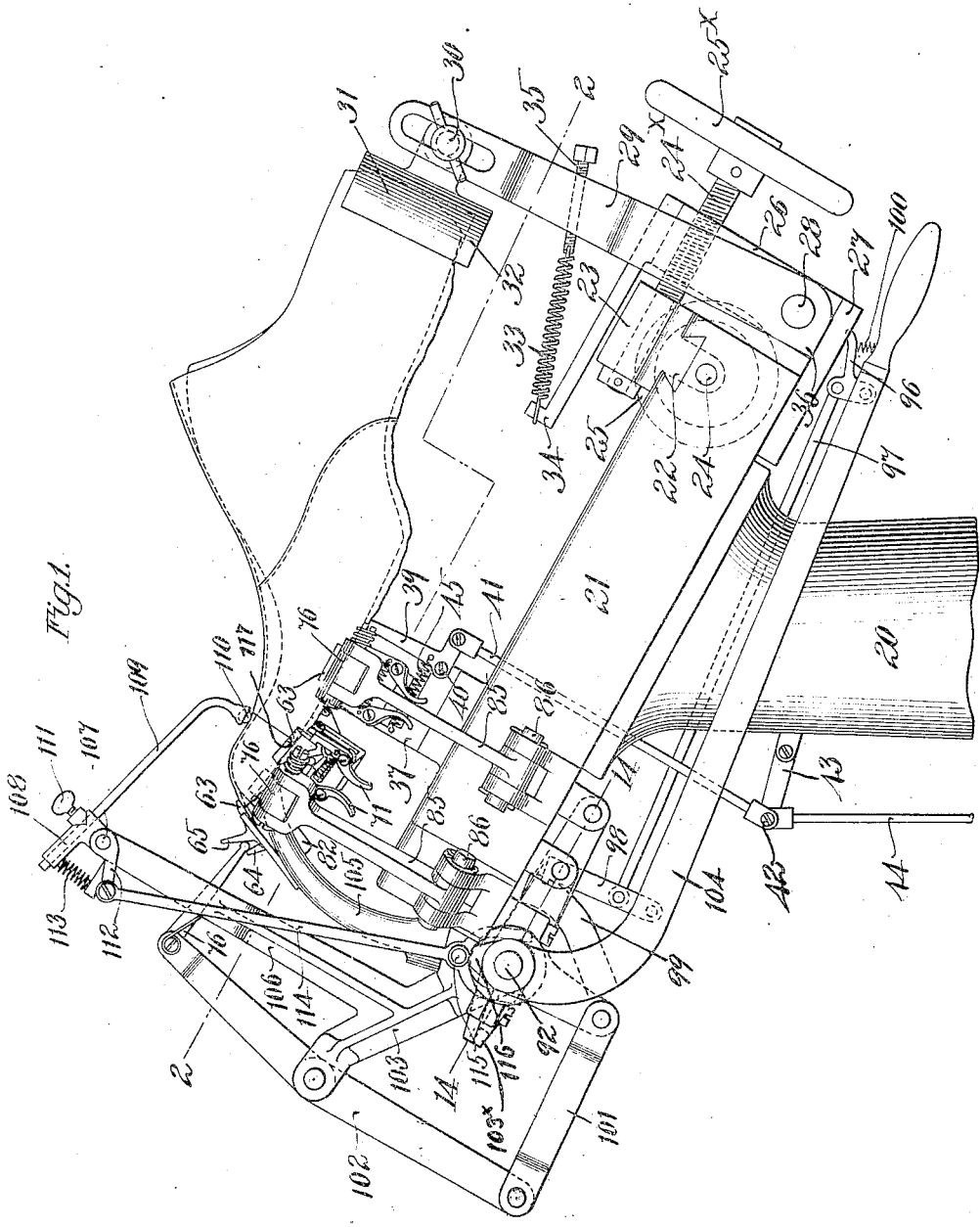

J. J. HEYS.
PULLING OVER MACHINE FOR BOOTS AND SHOES.
APPLICATION FILED APR. 19, 1906.

957,955.

Patented May 17, 1910.
6 SHEETS—SHEET 3.

Witnesses:
Sidney F. Smith
Robert H. Kammler

Inventor:
John J. Heys.
by Emery & Booth,
Attys

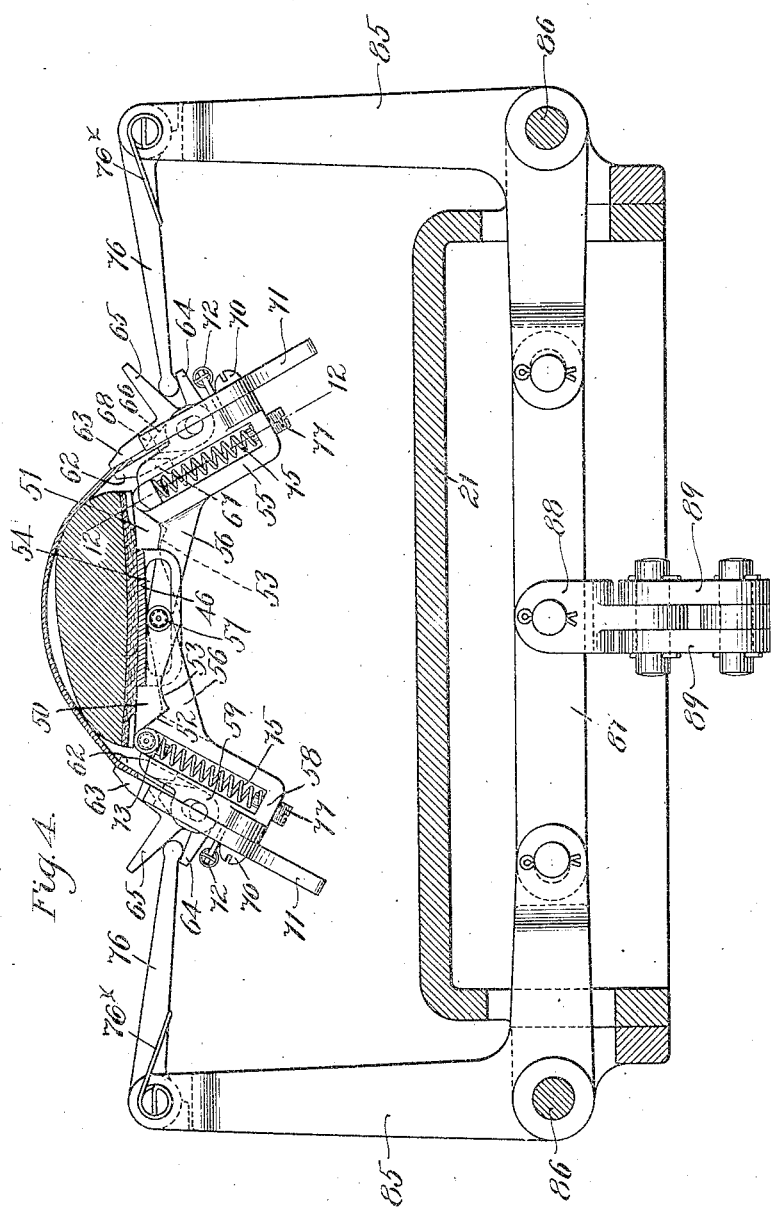

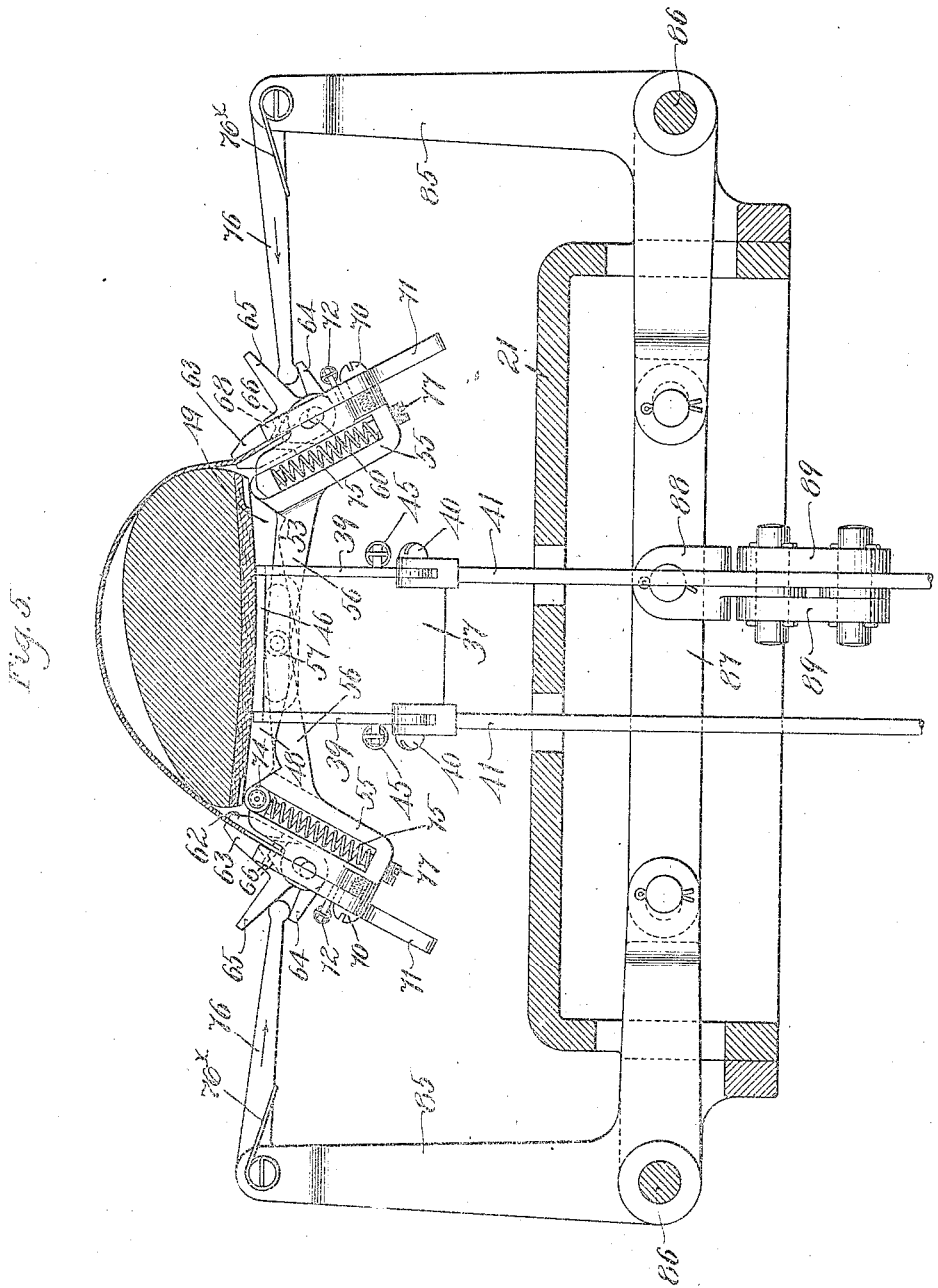

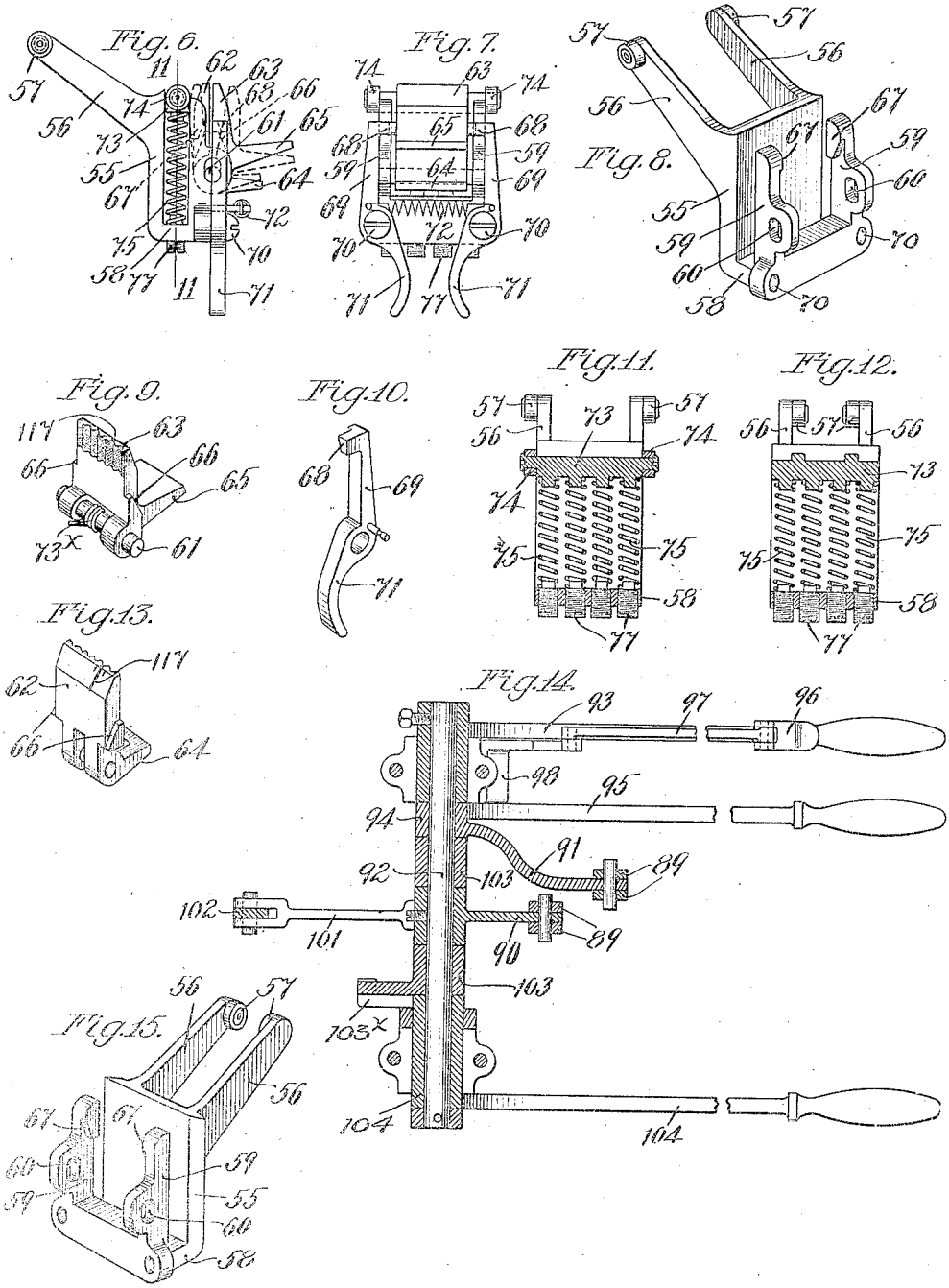

UNITED STATES PATENT OFFICE.

JOHN J. HEYS, OF LYNN, MASSACHUSETTS, ASSIGNOR, BY MESNE ASSIGNMENTS, TO THOMAS G. PLANT, OF BOSTON, MASSACHUSETTS.

PULLING-OVER MACHINE FOR BOOTS AND SHOES.

957,955.

Specification of Letters Patent. Patented May 17, 1910.

Application filed April 19, 1906. Serial No. 312,559.

*To all whom it may concern:*

Be it known that I, JOHN J. HEYS, a citizen of the United States, residing at Lynn, in the county of Essex and State of Massachusetts, have invented an Improvement in Pulling-Over Machines for Boots and Shoes, of which the following description, in conection with the accompanying drawings, is a specification, like figures on the drawings representing like parts.

This invention relates to machines for pulling over the uppers of boots and shoes preparatory to lasting the same.

Prior to my invention and in pulling over by hand it has been customary for the operative to take a last with the insole laid thereon and the upper with its linings, box toe, etc. assembled loosely thereon, and jack the last, sole uppermost, and then, by the use of ordinary lasting pincers, draw the upper, linings and box toe, down over the toe of the last and the insole laid thereon and tack the same at the tip of the toe, but without driving the tack completely home to its head. He would then seize the upper, linings and box at one side of the toe and in the vicinity of the middle of the tip, in front of the tip line, and draw it down and in, similarly to the toe and tack it, usually with two tacks, taking then the opposite side of the tip.

A high degree of skill has always been required in pulling over, because it is the first operation going to the final shaping of the upper to the last, and unless evenly and properly done, the entire upper will stand askew on the last. Great care also is required to bring the tip line into proper position and alinement to give the proper length and line of tip, and also in the smoothing out of the lining or linings, so that there may be no wrinkles between the upper and the parts within the same. After having been pulled over, the shoe went to the laster or lasters, who would last in the sides and toe either by hand or upon one machine or more, generally lasting in the sides by hand and the toe by the use of one of the well-known types of bed lasting machines. To accomplish this, the shoe would be jacked sole up in the machine, and some or all of the tacks employed in pulling over removed and the toe portion of the upper, its linings etc. being then wiped in smoothly by the wipers aided by hand manipulation of the pincers and secured finally in position.

As an improvement on the above described method of pulling over, a machine has been devised, in which the last with the insole laid thereon, and the upper and its linings assembled also thereon, has been placed in an oblique position with the toe of the last pointing upward toward the operative, and, when so positioned, the edges of the upper and linings at the two sides and tip of the toe, are placed in suitable pincers or jaws, which are closed thereon. The operative then starts the machine, which causes the said pincers or jaws simultaneously to draw the upper tightly about the toe portion of the last and lay the same inward over and upon the edge of the insole, where it is automatically tacked, as by hand, by tack driving mechanism operating directly behind each of the pincers or jaws. Provision is made for arresting the pulling operation at an intermediate point to give the operative opportunity to shift the upper on and with relation to the last for correcting the alinement and position of the upper before the final pulling and tacking is accomplished. An objection to this machine is that the position of the shoe prohibits a convenient view of the top of the shoe and the tip line, so that the operative finds it difficult, if not impossible, properly to aline the shoe and the tip and obtain the correct tip measurement. Furthermore, this machine is objectionable because of its cumbersomeness and complication, and, among other things, because it secures the uppers by tacks which in part or wholly must be withdrawn before the lasting takes place.

My invention contemplates positioning the last sole downward, and with the toe pointed outward and away from the operative, who is thus able to view the shoe much as the wearer would view it, and is therefore in the best possible position to observe and determine or correct the alinement of the shoe upper and tipline, and to obtain correct tip measurement and other results which go to make up a satisfactory pulling over operation.

Pincers or nippers are provided, which, under the control of hand levers, instead of power, may be manipulated as desired to draw down the upper and force the edge thereof inward upon the sole, where it is held not by tacks as heretofore, but by a temporary holding means, which may be a carrier to which the pincers or jaws themselves are attached and which goes with the shoe to the laster, serving as a temporary holder which may be released when the shoe is presented to the lasting devices, to give up control of the upper and linings to the latter, after which said temporary holder may be returned and again used for one or more succeeding operations of pulling over.

A machine containing the various features of my invention possesses many features of advantage and convenience, which will be best appreciated from a description of a machine illustrating one embodiment of my invention.

Figure 2:
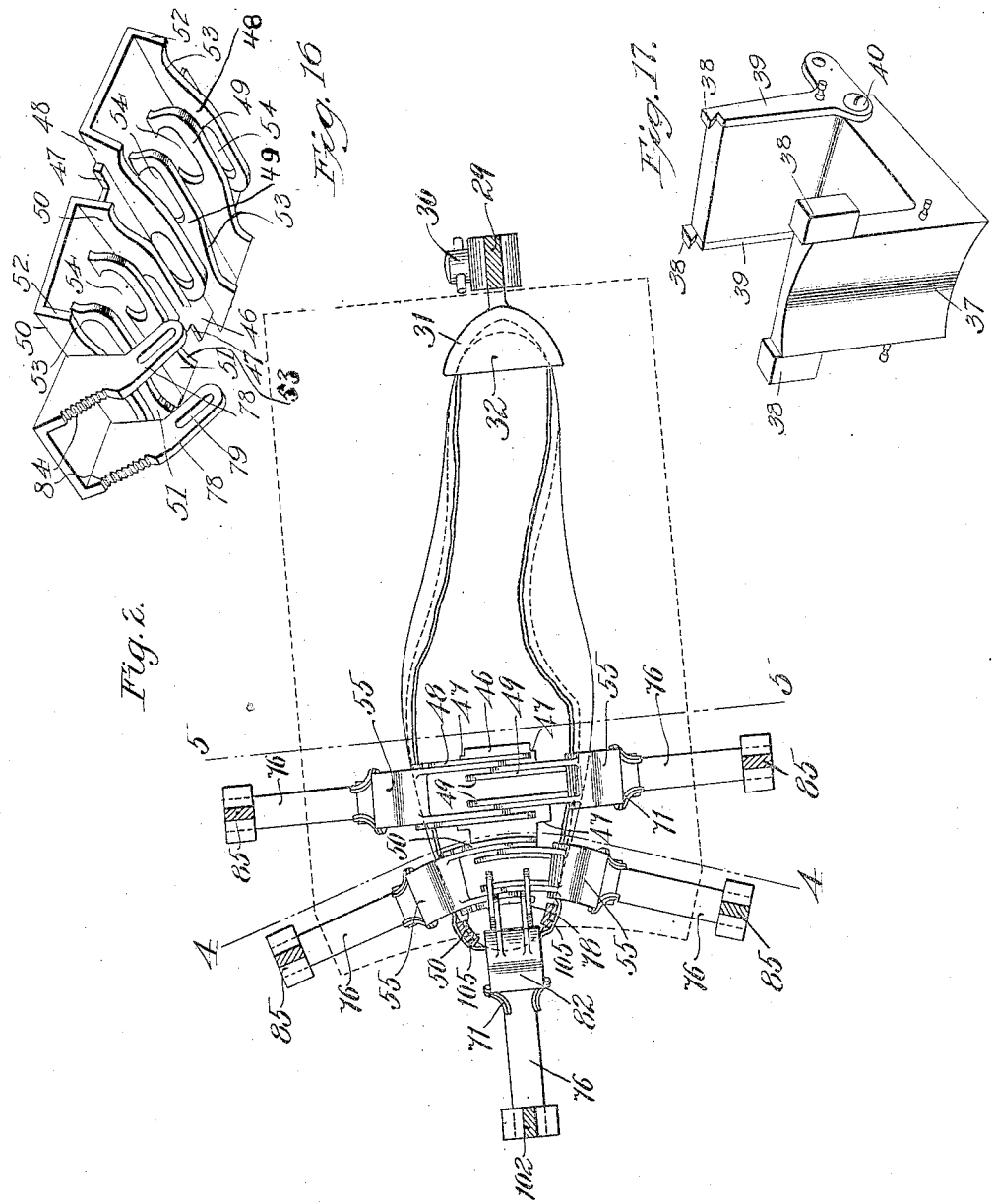
Figure 3:
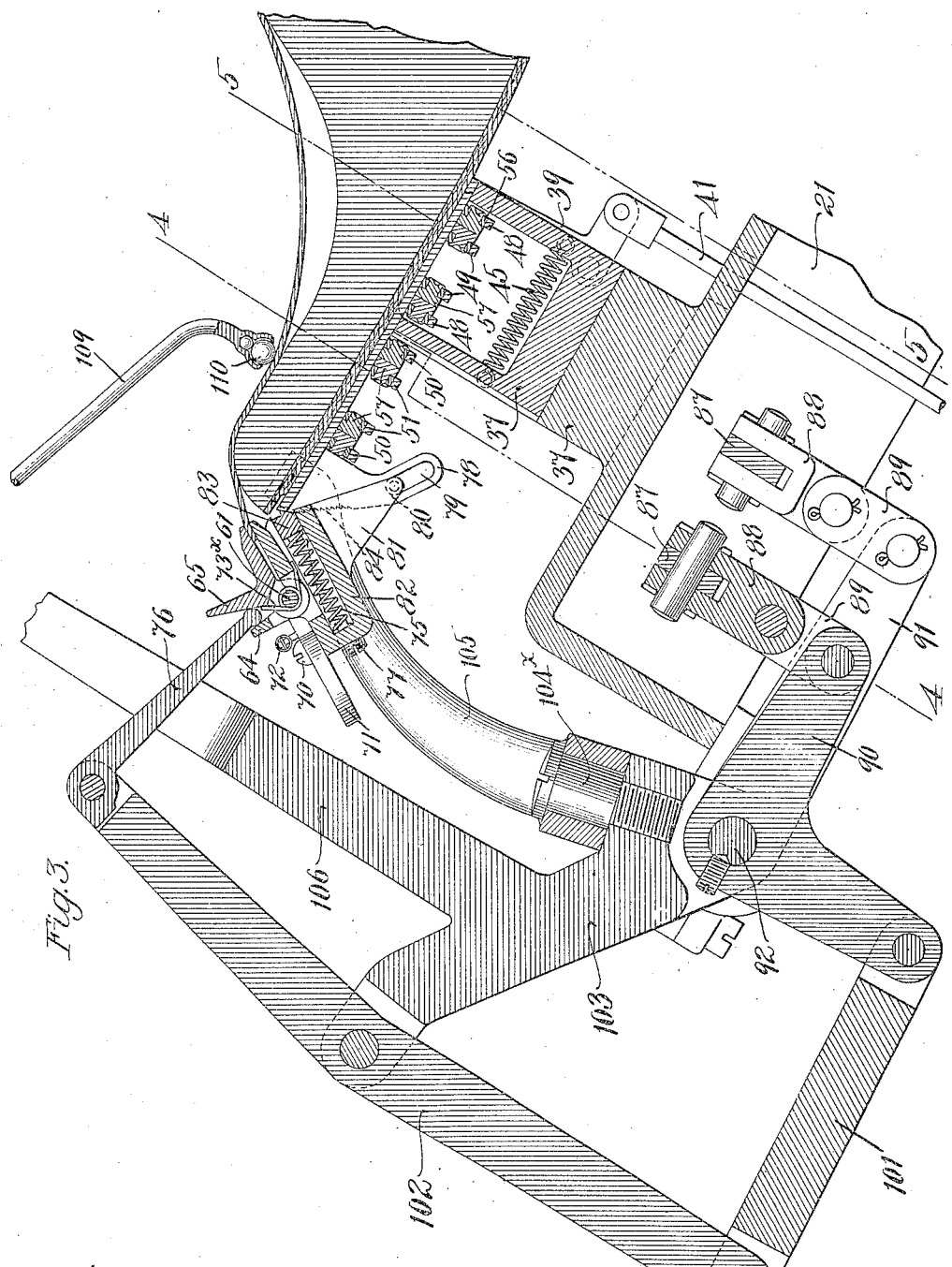

In the accompanying drawings,—Figure 1, in side elevation, illustrates the working parts of a machine illustrating one embodiment of my invention; Fig. 2 is a horizontal sectional view on the dotted line 2—2, Fig. 1, looking upward to the under side of the last with the sole thereon, said view showing the pincers or nipping jaws and their actuators viewed from beneath; Fig. 3 is an enlarged sectional detail of the toe portion of the machine shown in Fig. 1; Fig. 4, a cross sectional view taken on the dotted lines 4—4, Figs. 2 and 3; Fig. 5, a similar cross section on the dotted lines 5—5, Figs. 2 and 3; Figs. 6 to 13, inclusive, details to be referred to; Fig. 14, a horizontal sectional detail on the dotted line 14—14, Fig. 1; Figs. 15 to 17, other details to be referred to.

In the embodiment of my invention selected for illustration herein and shown in the drawings, referring first to Figs. 1 to 5, inclusive, the frame or column of the machine marked 20, carries at its upper end an inclined table, 21. At its lower end this table is provided at its upper side with a transverse dovetailed groove 22, in which slides a block 23, which may be adjusted along its said groove by means of an adjusting screw 24, operated by a hand wheel 25, shown at the far side of the machine. Freely rotatable in this block 23, but restrained from endwise movement therein, is a screw 24ˣ, provided at its end with a hand wheel, 25ˣ, and upon which is threaded a block 26, sliding at its under side upon a guide plate 27, secured to the under side of the table 21. This guide plate retains said block 26 in alinement and keeps it from rotating by and with the hand screw 24ˣ, when the latter is turned to adjust the block toward and from the lower end of the table. In this block 26, is loosely journaled a shaft 28, carrying an upwardly extended arm 29, slotted at its upper end to receive adjustably the clamping bolt 30, on and movable with the heel socket 31, shaped approximately to fit a heel of the last with the upper, counter and linings thereon and provided with a bottom 32, for the better support of the last. The heel socket may be adjusted vertically in the slotted end of said arm 29, and held in any position by the clamping screw 30, said arm 29, being drawn normally upward or to the left (Fig. 1), by a spring 33, secured at one end to an arm 34, on and adjustable with said block 26, and at its opposite end to a thumb screw 35, in threaded engagement with and adjustable in said arm 29. The spring actuated movement of said arm to the left (Fig. 1), is limited by squaring the lower end of said arm 29, as indicated at 36, for contact with the guide plate 27.

The inclined table 21, at or near its upper end, is provided at its upper side with a support 37, shown as formed in two parts but which may be, if desired, formed integrally. The upper part of this support is shown separately in perspective in Fig. 17, reference to which will show it to be of the general U-shape with its two side arms provided at their upper ends and inner faces with overhanging or dovetailed cradle seats 38. The seats at one of the sides of said support are shown as formed in the upper ends of upright arms 39, of bell crank levers, fulcrumed at 40, and with their horizontal arms (see Fig. 1), fitted for engagement by the upper ends of the pull down rods 41 (see Fig. 5). These rods at their lower ends are jointed at 42, to idler arms 43, to which are also jointed the upper ends of treadle operated arms 44, the treadles of which, however, are not herein shown. The cradle seat levers 39, are drawn normally and yieldingly toward the opposite cradle seats by springs 45 (see Figs. 1 and 3), they being movable away from said opposite seats and against the tension of said springs by the treadle mechanism described. In the seats thus provided is removably placed the cradle 46, shown separately in Fig. 16. This cradle is provided with lateral wings, forming dovetailed edges 47, adapted to engage and be seated in the cradle seats 38 (Fig. 17), previously described. To accomplish this the movable seat arms 39 are drawn outward and the cradle placed in position; after which said arms are released to permit them to close and thereby secure said cradle firmly in position upon and at the top of the support 37.

Referring now particularly to Fig. 16: the cradle 46 is provided with four transverse pairs of guide ribs marked respectively 48, 49, 50 and 51. The pairs of guide ribs 49, are arranged between and separated slightly from the guide ribs 48, while the guide ribs 51 are arranged between and slightly separated from the guide ribs 50, so that the four pairs of guide ribs are really nested in two sets. The guide ribs 48 and 50 project to the right from the cradle base, as viewed in Fig. 16, while the remaining ribs 48 and 51 project to the left from said cradle base and each of said ribs 48 to 51, inclusive, has its outer or projecting end beveled or inclined, as at 52, each bevel terminating at its inner end in a slight depression or seat 53. At its inner end, each of said ribs is provided with a slot 54; the slots in the ribs of each pair being respectively opposite each other, although the slots in the respective pairs are offset somewhat from each other, as shown.

Referring now particularly to Figs. 4 to 8, inclusive, each pair of slotted ribs is adapted to receive a nipper or jaw holder 55, which (see Fig. 8) comprises a head from which extend obliquely two tail arms 56, fitted at their free ends with roller studs 57, that enter and slide in the slots 54, of their holding ribs. The head of each holder (see Fig. 8) is provided with a bottom flange 58, from which rise two fingers 59, slotted vertically at 60. In these slots are entered the pivots 61, of the nippers or jaws 62, 63 (see Figs. 4, 5 and 6), hinged together and provided respectively with actuating ears, 64, 65. These two jaws are shown separately in perspective in Figs. 9 and 13. Each jaw at each of its ends near its pivotal point is provided with a tapered lug 66, which, when the two jaws are closed together, as in Figs. 4, 5 and 6, stand vertically between and below correspondingly beveled or tapering lugs 67 and 68 (see Fig. 8). The lugs 67 are on and form parts of the fingers 59 (Fig. 8), while the lugs 68 are on the upper ends of finger levers 69 (one of which is shown separately in Fig. 10), which levers are pivoted at 70 to the head flange 58 of the holder and are provided with finger extensions 71, best shown in Fig. 7. These lug fingers are drawn normally toward each other by a spring 72 (Fig. 7), against the tension of which they may be opened by the fingers for a purpose to be described. When the jaw pivots 61, are in the bottoms of their slots 60 (Figs. 6 and 8), the jaw lugs 66 are below the higher lugs, 67, 68,—which I shall hereinafter refer to as locking lugs; consequently, said jaws may be opened as indicated in dotted lines (Fig. 6), the outer jaw lug swinging beneath the finger stop lugs, 68. A spring 73ˣ, Fig. 9, tends normally to close the jaws, but by compressing the jaw ears 64, 65 (Fig. 6) together, by the fingers of the hand, said jaws may be opened, as in dotted lines, Fig. 6, to receive adjacent edges of the upper, the linings, and, it may be, the box toe, which are immediately seized by the jaws under spring pressure, as soon as they are released by the operative. The holder is also provided (see Figs. 6, 7 and 11) with a cross bar 73, provided at its end with rollers 74, which overlie and are adapted to ride up on the beveled or inclined ends 52, of the cradle ribs 48–51. This roller carrying bar is adapted to slide vertically in the slotted guideway formed between the holder head and the fingers 59 (see Fig. 8), and it is supported in said guides by a spring or springs 75. The last with the assembled upper and linings upon it is positioned as in Fig. 1, with its heel end in the heel socket 31, and its fore part raised upon the upturned bottom of the cradle 46, the edges of its upper at the required points, being inserted between the nipper jaws 62, 63, as described.

Referring now to Fig. 5: normally standing opposite and adapted to be pushed between the finger ears of the two jaws of each holder, is an actuator 76, which, when pushed inward in the direction of the arrow thereon, will operate first to separate said ears and close the jaws more firmly against the materials inserted between the same; and the greater the pressure exerted to push the actuator 76 inward, the more firmly will the said jaws grip the embraced materials, so that there is no liability of the grip giving away under the action of the actuator. Each actuator is held normally in elevated position by suitable means, as a spring 76ˣ, which holds the actuator at such a level that when pushed inward its end first strikes the under side of the ear 65 and is deflected thereby down into the opening between said ears 64, 65, to create the clamping pressure described and take such a bearing as will permit the jaws to be pushed inward. As this actuator is pushed inward, it tends also to push the jaws and the holder therefor likewise inward, the roller studs 57 on the tail arms 56, sliding across the cradle under the sole of the shoe. As the holder is thus made to slide inward and across the cradle, the rollers 74 on the spring supported bar 73, are compelled to ride upward on the inclined end 52, of the cradle ribs for that holder. This causes the jaws to pull downward and inward, thereby to pull the upper and lining downward over the last and lay the same more or less inward over and under the edge of the insole, according to the pitch and length of said inclined faces.

When the upper has been pulled down to the safe limit, determined by the strength of the springs 75, which may be adjusted by adjusting means 77 (Fig. 6), said springs will commence to yield so as to permit the rollers 74 still to climb the inclines without unduly further stretching the upper until said rollers clear the summits of their respective inclines, when they will immediately drop into the seats 53 (Fig. 16) behind said summits and there rest. This final movement over the summits of the inclines and into said seats, causes the jaws to fall inward under the edge of the insole to drop the upper closely against the said insole and substantially in the position where it would be tacked if pulled over by hand. By reference to Figs. 4, 5 and 16, it will be seen that there are four of these jaw holders with their jaws, one for each pair of slotted cradle ribs, two of the said holders being at one side of the fore part of the last, and two at the opposite side thereof. It will be observed also that each pair of jaws is provided with an actuator, 76, so that if all four actuators are pushed inward together, or, if the actuators of either pair of holders be pushed inward simultaneously, then the jaws actuated thereby, will be caused to nip the upper and lining and pull the same downward about the last and inward to lay the same against the under surface of the insole, just as if the operative had seized upon the upper at opposite sides of the toe portion of the last and pulled the same downward and under at the same time, said jaws remaining in the positions to which they have pulled the upper without any tacking or other fastenings.

Referring to Fig. 5: when the actuators 76, are first moved inward and tend to move their holders transversely under the shoe and the cradle, this transverse movement is resisted by the spring supported rollers 74, which are caused to ride down the inclines of the slotted ribs. Since the holders cannot move inward faster than the said rollers will traverse their respective inclines, it follows that the action of said inclines on the rollers will tend to throw the rollers downward faster than the jaws will move downward, the jaws being held by the upper. This movement of the holder relative to and faster than the jaws, is permitted by the slots 60 (Fig. 8), in which the jaw pivots are placed, and as the said holders so move relative to the jaws, the locking lugs 67, 68, on the holders, move into position straddling and embracing the corresponding lug 66 on the jaws, until they bring up firmly and seat against the said jaw lugs, when further movement of the holder relative to the jaws, is prevented. This embracing contact of the locking lugs about the jaw lugs, acts by reason of the inclined contacting surfaces thereof, to press the said jaws all the more tightly together and upon the embraced materials. When, now, the holders and their jaws have been pushed inward to the limit of movement and the holders lodged with their rollers in the rib seats 53, as stated, the actuators 76 may be withdrawn and the upper and linings will remain under tension and held by the jaws in their final positions without any tacks or other fastenings employed, for, the very tension of the upper and linings seeking to recover to their original positions, will, by tending to pull the jaws upward relative to their respective holders, tend the more firmly to wedge the jaw lugs 66 between the locking lugs 67, 68, thus insuring firm holding engagement of the jaws with and upon the embraced materials.

At the tip (see Figs. 3 and 16) is a pair of slotted ribs 78, which drop obliquely from the cradle and underlie the first set of transverse ribs. The slots in these toe ribs 78, are indicated at 79, and they receive roller studs 80 (Fig. 3), upon the tail arms 81, of the toe holder 82. This toe holder 82, is in every respect substantially like the side holders described, its jaws being similarly marked with similar letters of reference. Instead of having its spring supported bar 73 equipped with rollers, as with the side jaws, the said bar for the toe jaws is shown as provided with a ratchet block 83, adapted between its ends (Fig. 12), as it rides up the inclined faces of the slotted cradle ribs, to traverse ratchet surfaces 84 (Fig. 16) in which said ratchet block may lodge, to hold the said toe jaws in whatever position they may have been moved by the actuator 76 (Fig. 3) therefor.

Referring now to Figs. 1 to 5 and 14: the side actuators 76, are jointed respectively to the upper ends of upright arms 85 of bell crank levers fulcrumed at 86, on the table and having their horizontal arms connected across the machine in pairs by equalizers 87, two in number, one for each of the two pairs of actuators shown. Each of these equalizers is connected universally by links 88, 89, with the horizontal arms 90, 91 (see Figs. 3 and 14). The arm 90 is fast upon a shaft 92, journaled in suitable bearings on the under side and at the upper end of the table 21, said shaft at its remote end (Fig. 1) and upper end (Fig. 14), having fast upon it an operating lever 93, which extends rearwardly and downwardly toward the operative standing next the lower end of the inclined table. Depression of this operating lever will rotate said shaft 92, to depress the arm 90 and thereby through the connections described, cause the actuators 76 to be pushed inward to operate the pulling over jaws. The other arm 91 (see Fig. 14) is offset and attached to a sleeve 94, loosely mounted on said shaft 92 and provided also with a handle lever 95, arranged substantially parallel with and at the same side of the inclined table as said operating lever 93.

The operating lever 93 is provided with a finger operated latch 96, controlling a latch rod 97, connected with and to operate a latch 98, adapted (see Fig. 1), to couple the said lever 93 to a notched segment 99, on the side of the handle lever 95. If said latch is not operated, the two levers are coupled together, the finger latch being provided with a spring 100, which holds the same normally lifted to cause its latch device to couple the two handle levers one to the other, so that depression of either lever, preferably that provided with a finger latch, will cause like depression of the second handle lever and simultaneous inward movement of all the side actuators 76. When, however, it is desired to operate either handle lever singly for the purpose of operating either pair of side actuators without the other pair, the finger latch may be depressed to uncouple the handle levers and permit them to be operated separately, as desired.

Referring now to Figs. 3 and 14: the lever 90 is made as a bell crank lever, its other arm being connected by a link 101 with the lower end of a lever 102, to the upper end of which the actuator 76 for the toe jaws is jointed. By these connections, whenever the lever 90 is depressed by the handle, the toe actuator 76 will at the same time be pushed inward toward the toe to operate the toe jaws simultaneously with the leading pair of side jaws. So, also, if the two handle levers 93 and 95 are coupled together, all five jaws will be operated simultaneously.

Loosely mounted upon the cross shaft 92 and at opposite sides of the middle bell crank lever 90, is mounted a yoke 103, secured, with a limited lost motion, at 103×, at its outer end to an operating handle 104, which stands at the opposite side of the inclined table from the handles 93, 95, but is similar in shape and position, the toe actuator lever 102 being fulcrumed to an arm on this yoke (see Fig. 3). This yoke has fulcrumed to it at 104× a last moving fork, comprising two arms, 105, curved upward and inward, and also twisted, so that at their upper ends they may be notched to fit or engage the corners of the toe of the last within the inmost lining. This will best appear in Fig. 3, where said last moving forks are more plainly shown. By swiveling these arms to the supporting yoke 103, they are free to swing to adapt themselves to the toe of the last; whatever be its direction of swing. When the last is first positioned upon the cradle, these fork arms 105 are caused to engage the edge of the last close to the bottom thereof and as close to the toe as possible, the upper and linings being spread outward to embrace the same before they are inserted in the jaws. After all the jaws have been engaged with the upper and linings, the operative by means of the handle lever 93, throws inward the several actuators to cause them firmly to grip the embraced materials, but without tensioning the latter to any appreciable extent, and then, by depressing the handle 104 at the left side of the table, pushes the last in and relative to the upper and toward the heel socket to firmly seat it in the upper;

after which he further depresses the handle lever 93 to pull down the upper over and about the last and lay it inward under the edge of the insole. To determine the extent to which the last shall be thus pushed within the upper and toward the heel,—in other words to determine the length of the tip, I have provided the yoke 103 with an arm 106, rising therefrom (see Fig. 1), to the upper end of which is pivoted at 107 a socket 108, in which slides a light rod 109, in the curved lower end of which is mounted loosely a ball tip gage 110. This rod may be adjusted longitudinally in the socket 108, and held in desired position by a clamping screw 111. On the same pivot 107, is loosely mounted an arm, 112, between which and said socket 108, is interposed a spring 113 connected at its ends to the parts 108 and 112. Depending from the arm 112, is a rod 114, forked at its lower end to straddle the hub of the handle lever 104 and provided with a roller stud 115, for engagement by a cam 116, on the hub of said handle lever.

In the normal position of the machine before a shoe is pulled over, the rod 114 stands depressed by its weight or suitable means and the tip gage arm 109 raised into its elevated position as will be readily understood. When, however, the operative depresses the handle 104, to push the last back into the heel portion of the upper, the cam 116 on the hub of said handle lever is turned upward and acts upon the roller stud 115, to lift the rod 114 and through the spring 113, throw the tip gage downward into yielding contact with the upper and in full view of the operative looking down upon the shoe from above. The operative then by continuing his depression of the handle lever 104, takes up the lost motion at 103×, and thereafter and while holding the tip gage depressed upon the shoe, swings the yoke 103 to push the last back into the heel portion of the upper to push the latter rearward, the heel socket arm 29 yielding before it, and the tip gage 110 moving rearward with the last, until said tip gage reaches the tip line of the stationary vamp. The tip gage having been previously adjusted for this style of shoe, the operative knows that his tip measurement now will be accurate, and holding the handle lever 104 depressed, now depresses the right-hand lever 93, to pull down the upper and its linings upon both sides and at the tip of the toe. Since the tip measurement has been accurately determined before the pull over jaws were operated, and since all the pull over jaws are operated together, there can be no possible disturbance or disarrangement of the tip position during the pulling over movement and the tip line is left where positioned by the setting back of the last.

When the last is set toward the heel the tip gage moves with it and the tip measurement is determined by the distance through which said gage moves before it reaches the tip line of the upper held in the jaws.

To insure accurate position of the tip line in and with relation to the side jaws, I have provided the upper edges of the leading pair of side jaws with gage marks 117 (Figs. 9 and 13), and when inserting the edges of the upper in the jaws preparatory to pulling over the shoe, the tip line is brought to these gage marks and the jaws then closed thereupon.

The accuracy of the tip line across the shoe being fixed by the insertion of the upper in the jaws to the gage marks thereon, and the length of the tip back from the toe being fixed by adjustment of the tip gage, it follows that when the last is pushed to the heel until the tip gage registers with the tip line of the upper held in the jaws, absolute certainty of position and alinement of the tip line to the last, is assured in the operation of the machine, rendering it unnecessary partially to pull over the shoe and then arrest the pulling over operation to adjust the partially pulled upper upon the last, or the last in the partially pulled upper before completing the pulling over operation, as in the pulling over machines of the type first above referred to.

When the pulling over operation has been completed the handle levers are raised to withdraw the pushers or actuators 76 and the rods 41 (Figs. 5 and 17) are depressed to throw back the cradle seat levers 39 to free the cradle, when the pulled over shoe and last may be lifted from the machine, taking with it the cradle held tightly clamped against the bottom of the insole with its several jaws holding tightly and firmly in position the edges of the pulled over upper and lining, and in this condition the shoe is taken to the laster for the lasting operation.

The lasting machine best adapted to complete the operation begun upon the machine described, is a machine of the bed type, such, for instance as the so-called "Ideal" machine, a recent form of which is shown in U. S. Letters Patent No. 521,954, dated June 26, 1894.

The pulled over shoe with the temporary holder thereon, is jacked in the lasting machine in usual manner, sole uppermost, and the toe wipers are brought up against the pulled over upper at opposite sides of the toe end of the last. After the wipers have contacted with the upper and are able by their frictional engagement therewith to clamp or bind the upper against the edge of the insole with sufficient firmness to prevent retraction or pulling away of the upper, the nippers or jaws of the temporary holder are released and said holder removed. These jaws, as heretofore stated, may be released at any time by compressing toward each other (see Fig. 7) the finger ends 71, of the levers 69, carrying the movable locking lugs 68, which latter are thereby separated one from the other to free the outer jaws of the nippers controlled thereby, so as to release the upper at that point. By using the fingers of both hands two sets of jaws or nippers may be released simultaneously, so that quick work may be made of removing the temporary holder to leave the pulled over upper wholly in the control of the wipers of the lasting machine.

In the preferred mode of operation the operative will now wipe in the upper over and upon the insole in usual manner, paying practically no attention to anything but the material along the sides of the tip. One wipe inward will ordinarily be sufficient to lay down the upper at both sides of the tip; after which the wipers are partially withdrawn, leaving sufficient contact merely along the edges to retain the infolded and lasted upper thereat, which is then tacked in usual manner along both sides. The operative now preferably withdraws the wipers and again throws them upward and inward toward and to last the upper around the point of the toe, repeating the inward or wiping movement as many times as necessary; after which the wipers are again partially withdrawn and the remaining portion of the toe around the point thereof, tacked in usual manner. In lieu of the tacking around the toe, of course the usual tape or wire may be used, if desired, in welt work.

From the foregoing it will appear that the pulling over operation in the first place is very much simplified, as compared with machines heretofore devised, by reason of the more convenient positioning of the shoe, and also the accuracy of the tip line and tip measurement may be much more conveniently and readily obtained than heretofore. By permitting the operative to pull over the machine by hand he is able to "feel" the pull imparted by and through the nippers or jaws, so as to adjust the pull and work the upper more as is done by hand, thereby to save the upper and at the same time to lay the upper properly in position; the operative at all times having more complete control over the process than is possible where it is taken out of his hands and performed entirely by a machine. Furthermore, the upper is pulled over substantially simultaneously all around the toe end of the shoe, where it is held by the devices which perform the pulling over operation, involving no delay, such as results from the use of tacks to retain the upper in pulled over position, which tacks must also be removed before or during the subsequent lasting process.

No inconvenience of moment is involved in handling the shoe with the temporary holder attached, as heretofore described, because the shoe may be placed upon the racks as if the holder were not attached and when finally placed in the lasting machine, it is more convenient and expeditious to remove the holder than tacks, if the latter were used.

An important consideration is that there is no possible recovery or relaxation of the upper from its pulled over condition during the interim between the pulling over and subsequent lasting processes, such as is possible where the control is transferred from nippers to tacks, and again from tacks to lasting devices.

By corrugating or fluting the engaging faces of the nippers or jaws, as indicated in the drawing (Figs. 9 and 13), particularly around the point of the toe, the necessary plaits, usually required to be put in by hand manipulation of pincers, are already started at the time of the pulling over, so that during the lasting process, after release of the pulling over jaws, the edges of the upper, its linings, etc., have already put into them scorings or folds that lead the material almost naturally to assume the required completed formation, thereby reducing hand manipulation to a minimum and correspondingly facilitating the lasting process.

Of course, the number of jaws employed, and the spacing and arrangement of the same, may be varied at will, and while I have found the arrangement herein illustrated, to furnish excellent results, my invention, nevertheless, is not restricted thereto. By mounting the toe actuator upon an arm 103, which is upon the yoke that carries the last moving devices, said toe actuator is adjusted automatically with the last moving devices to accommodate lasts of varying lengths.

An equipment such as required for the pulling over outfit described, even including the required number of holders, is less expensive than one of the large and complicated pulling over machines, such as now in commercial use, and the skill required for operating the machine described, is very much less than where the more complicated machine is employed.

The pulling over operation performed by the machine described, simulates more closely the hand and best process, than any machine devised, so far as known to me, and is the only machine, I believe, wherein provision is made for setting the last back into the heel or counter of the shoe before the upper is pulled down over and at the toe portion thereof and which is essential for the best work in pulling over. This is also the first machine, so far as known to me, wherein means is provided first for accurately and invariably locating the tip line relative to the pulling over devices; and second, wherein is provided a positive tip gage adjacent the tip line and relative to which the upper and last may be adjusted during the pulling over operation to secure an invariable and reliable tip measurement.

Shoes of pronounced right and left swing and of any extent of swing, may be handled by the machine as conveniently as straight shoes by adjustment transversely of the table of the heel socket at the lower end thereof, so that at all times the several lines of draft may be adjusted as necessary properly to lay the upper upon a last of any given curvature or formation.

Particularly important is the fact that the pulling over operation proceeds without interruption from beginning to end; that is, when once the nippers or jaws have obtained hold upon the upper and commenced their downward and inward pulling over movement, there is no occasion for any interruption in that movement, as in machines at present in use, for the purpose of determining whether or not the tip line measurement is correct; for, as stated, the tip having been in the first instance, accurately positioned in the nippers, and the preliminary setting back of the last into the heel portion of the shoe, under the control of the operative, having given him opportunity at the outset for all necessary variations in handling the shoe, the pulling over operation proper, when once commenced, may be continued without interruption, thus insuring a better and more uniform result than where it proceeds by steps with a shifting of relationship of the various parts between successive steps.

Having described my invention by means of one embodiment thereof as an illustration of the same, what I claim in addition thereto and desire to secure by Letters Patent, is,—

1. A pulling over machine comprising means arranged for supporting a shoe with its forepart and tip line in full view of the operative and with the toe of the last pointing in a direction of non-intersection with the plane of the machine front, and oblique thereto, to present the shoe to visual inspection of the operative as it appears on the foot; tip line gaging means to define the position the tip line should occupy, and pulling over means constructed and arranged to pull the upper over the last and position the upper upon the last.

2. A pulling over machine comprising means for pulling over and positioning the upper on the last, in combination with means to support the last with its bottom directed downward and resting in a plane at an angle to the horizontal and with its toe pointing upward and away from the workman, the parts being so constructed and arranged that the view of the forepart and tip line of the upper on the last is unobstructed and the shoe is made observable to the workman similarly to viewing it on the foot, and a tip line gage also in view of the workman to determine the position the tip line should occupy with respect to the last.

3. A pulling over machine comprising shoe supporting means for supporting a shoe sole downward, pulling over means to operate upon a shoe so positioned, tip gaging means relative to which the tip on a shoe may be positiond, and means for causing said gage to move to and from operative position.

4. A pulling over machine comprising a shoe support, pulling over means and tip positioning means to determine the positioning of the upper in and relative to said pulling over means, and means for moving the tip positioning means into and out of operative position.

5. A pulling over machine comprising shoe supporting means, pulling over means and tip measuring means relative to which the shoe tip may be adjusted in the operation of pulling over to obtain proper tip measurement, and means acting automatically as the pulling over means is manipulated to move the tip measuring means into operative position.

6. A pulling over machine comprising shoe supporting means, pulling over means, and tip measuring means normally in inoperative position, with means for placing it in operative position to coöperate in the pulling over process.

7. A pulling over machine comprising shoe supporting means, pulling over means and tip measuring means normally in inoperative position, with means to place it in measuring position and to operate the pulling over means.

8. A pulling over machine comprising shoe supporting means, pulling over means and tip measuring means adapted to contact with the upper prior to the pulling over of the same and to gage the position of the latter as it is pulled to the last.

9. A pulling over machine comprising shoe supporting means, pulling over means, a tip measurer and means to move the same into and out of tip measuring position.

10. A pulling over machine comprising shoe supporting means, pulling over means fitted to enable the upper to be positioned therein with its tip line invariably positioned relatively thereto and tip measuring means independent of said pulling over means and relative to which said tip may be positioned by the pulling over process.

11. A pulling over machine comprising shoe supporting means, pulling over means, and means for engaging the toe end of the last operable preliminarily to set the last back into the heel portion of the upper and relatively to the upper.

12. A pulling over machine comprising shoe supporting means, pulling over means, and means to set the last heelward relative to the pulling over means, said means being arranged to engage the last above its tread face.

13. A pulling over machine comprising a yielding heel support, last moving means constructed to engage the toe of the last above its bottom face, and pulling over means.

14. A pulling over machine comprising shoe supporting means, pulling over means, means preliminarily to set the last heelward, and tip measuring means relative to which said last may be moved.

15. A pulling over machine comprising last supporting means, pulling over means, tip measuring means, and means for setting the last heelward and at the same time moving said tip measuring means from inoperative to operative position.

16. In a pulling over machine, the combination, with pulling over means adapted to engage the upper, of means for moving the last heelward in a right line with respect to the held upper, and a heel support constructed and arranged to move with and by reason of the last movement.

17. In a pulling over machine, the combination, with pulling over means adapted to engage the upper, of means for moving the last heelward in a right line with respect to the held upper, a heel support constructed and arranged to move with and by reason of the last movement, and means for returning said support to its initial position.

18. In a pulling over machine, the combination, with pulling over means adapted to engage the upper, of means for moving the last heelward in a right line with respect to the held upper, and a support adjustably and yieldingly mounted to receive the heel of a shoe and to move with and by reason of the last movement.

19. In a pulling over machine, the combination, with pulling over means adapted to engage the upper, of means for moving the last heelward in a right line with respect to the held upper, and a heel support transversely and longitudinally adjustable to receive different kinds of shoes and yieldingly mounted to accommodate the action of the last moving means.

20. A pulling over machine comprising pulling over means, last moving means to engage the end of a last and move it heelward and heel supporting means yieldingly pressed toward said last moving means and movable therewith.

21. A pulling over machine comprising a temporary and removable holder comprising a cradle provided with upper engaging and holding devices and means permanently with the machine for engaging said holding devices and laying the upper in pulled over position to be held therein by said holding devices.

22. A pulling over machine comprising a heel support, a fore part support, a temporary holder mounted upon the latter, and means coöperating therewith to actuate said holder for pulling over an upper and leaving it in pulled over position held by said holder.

23. A pulling over machine comprising a removable holder carrying pulling over devices, and actuating mechanism for said pulling over devices permanently with the machine.

24. A pulling over machine comprising a temporary holder equipped with pulling over jaws, means permanently with the machine to move said jaws to pull over an upper, said means acting to enforce pulling over engagement between said jaws and the upper.

25. A pulling over machine comprising a removable holder, and upper holding jaws connected therewith and constructed to increase holding engagement with the upper with every increase of pull tending to retract the upper.

26. A pulling over machine comprising a temporary holder, pulling over jaws mounted thereon and means to release said jaws from the upper held thereby.

27. In a pulling over machine the combination, with a plurality of pulling over devices and a plurality of trains of operating mechanism therefor operable to strain the upper, of means for alternatively operating said trains collectively or independently in straining the upper at will.

28. A pulling over machine comprising a plurality of pulling over devices having independent trains of operating mechanism operable to strain the upper, an interconnecting device, and controlling means for said device whereby said pulling over devices may be operated collectively or independently.

29. A pulling over machine comprising grippers acting on different portions of the forepart of an upper, separate devices for independently operating the grippers at each portion of the upper to strain the same, and means for connecting said operating devices to strain all portions of the upper simultaneously.

30. In a machine of the class described, the combination with pulling over means, of last moving means constructed and arranged to engage the end of the toe of the last, and separate operating means therefor.

31. A pulling over machine comprising means for moving the last heelward longitudinally within the upper, pulling over means, and separate, manually operable means therefor.

32. A pulling over machine comprising last moving means, pulling over means and tip gaging means connected with said last moving means and to be moved therewith.

33. A pulling over machine provided with a universally movable tip measuring device.

34. A pulling over machine comprising an inclined table, and means for pulling over the shoe including a movable heel support at the lower end of said table, a removable temporary holder at the upper end of said table, pulling over actuators coöperating with said holder adjacent the upper end of said table and means for operating said actuators.

35. A pulling over machine comprising an inclined table, a movable heel support at the lower end thereof, a removable temporary holder at the upper end thereof, pulling over actuators adjacent said upper end of said table, means for actuating said actuators and a tip measuring device also at the upper end of said table.

36. A pulling over machine comprising an adjustable and yieldable heel support 31, a cradle removable with the shoe provided with pairs of jaws 62, 63, jaw actuators 76, and means for operating them.

37. A pulling over machine comprising a yieldable heel support, a temporary holder comprising a cradle provided with pulling over jaws, jaw actuators, last moving means comprising the arms 105, and means to operate the latter.

38. A pulling over machine comprising a yieldable heel support, a temporary holder comprising a cradle provided with pulling over jaws, jaw actuators, last moving means comprising swiveled last operating arms 105, and means to operate the latter.

39. A pulling over machine comprising a temporary holder comprising a cradle having jaws 62, 63, a jaw holder, its tail portion 56, and guides for the latter on the cradle, and actuators for said jaws.

40. A pulling over machine comprising a temporary holder comprising a cradle having jaws 62, 63, a jaw holder, its tail portion 56 and guides for the latter on the cradle, jaw holding and releasing means and actuators for said jaws.

41. A pulling over machine comprising a temporary holder comprising a cradle having jaws 62, 63, a jaw holder, its tail portion 56, and guides for the latter on the cradle, a spring in said jaw holder for controlling the strain on the upper, and actuators for said jaws.

42. A pulling over machine comprising a temporary holder comprising a cradle having jaws 62, 63, a jaw holder, its tail portion 56, and guides for the latter on the cradle, a spring in said jaw holder for controlling the strain on the upper, a ratchet device supported by said spring, and actuators for said jaws.

43. A pulling over machine comprising pulling over jaws, a fixed rest for the same in pulled over position, and a spring interposed between said rest and jaws to permit variable relationship between the same.

44. A pulling over machine comprising pulling over jaws, a support therefor and between which and said jaws there is a lost motion, and jaw locking devices controlled by said lost motion.

45. The combination in a pulling over machine of a plurality of sets of pulling over jaws removable from the machine with the pulled over uppers and a jaw actuating mechanism for actuating the sets of pulling over jaws.

46. A pulling over machine comprising a shoe support, pulling over means, one or more actuators therefor, and means to support said actuator or actuators normally in position for automatic engagement with said pulling over means.

47. A pulling over machine comprising a shoe support, pulling over means removable with the shoe, one or more actuators therefor, and means to support said actuator or actuators yieldingly in position for automatic engagement with said pulling over means.

48. A pulling over machine comprising a shoe support, pulling over means, and an actuator for the latter normally independent thereof but adapted to engage and operate said pulling over means and made deflectable to follow the course of said pulling over means in the act of pulling over an upper.

49. A pulling over machine comprising a shoe support, pulling over means for the toe of an upper, and actuating means therefor, and last moving means connected with said actuating means to cause automatic adjustment of the one by the other for lasts of different lengths.

50. In a pulling over machine, grippers, and means for relatively moving the last and upper with respect to the grippers for positioning the tip line of the upper angularly prior to closing the grippers upon the upper.

51. In a pulling over machine, pulling over means on opposite sides of the last and means for relatively moving the last and upper with respect to the grippers for positioning the tip line of the upper prior to its engagement by said pulling over means.

52. In a pulling over machine grippers arranged on opposite sides of the last, each pair provided with an index to position the tip line of the upper, and means for relatively moving the grippers and upper prior to seizure of the upper by the grippers.

53. In a pulling over machine, two pairs of gripper jaws, a jaw of each pair provided with an index line, and said jaws so arranged on opposite sides of the shoe that on placing the ends of the tip line between said jaws and in alinement with said index the tip will be correctly positioned on the shoe, and means for moving the last heelward.

54. A pulling over machine comprising shoe sustaining means to support a shoe in an upwardly inclined position, sole downward, pulling over means, and a gaging device movable as the pulling over means are moved to determine the position of a part of the shoe upper with respect to the last.

55. A pulling over machine comprising in combination shoe supporting means, pulling over means arranged at the side and toe of the shoe, and a gaging device movable into and out of operative position and coöperating with the pulling over means to properly position the upper of the shoe.

56. A pulling over machine comprising a heel support, means to yieldingly sustain said support, and a last engaging finger to contact with the last in front of the heel and set the last back in the upper.

57. A pulling over machine comprising a shoe support, pulling over means, a finger to engage the last at the forepart, and means for causing said finger to move the last backward preliminarily in the upper.

58. In a pulling over machine, a tip measurer, and automatic means to move the same into and out of tip measuring position.

59. In a pulling over machine, a tip measurer, and automatic means to move the same into tip measuring position, maintain it in such position for a predetermined period and then remove it from tip measuring position.

60. In a pulling over machine, the combination of a side gripper provided with positioning marks for the tip to preliminarily position the tip with respect to the grippers, a tip measurer, and means to move the tip measurer into and out of tip measuring position.

In testimony whereof, I have signed my name to this specification, in the presence of two subscribing witnesses.

JOHN J. HEYS.

Witnesses:
  WILLIAM C. HABBERLEY,
  FREDERICK L. EMERY.